United States Patent
Sato

(10) Patent No.: US 6,539,498 B1
(45) Date of Patent: Mar. 25, 2003

(54) METHOD OF DETECTING CAUSE OF FAILURE IN COMPUTER

(75) Inventor: Shingo Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/480,126

(22) Filed: Jan. 10, 2000

(30) Foreign Application Priority Data

May 6, 1999 (JP) ............................................. 11-126101

(51) Int. Cl.[7] ................................................. G06F 11/00
(52) U.S. Cl. .......................................... 714/38; 714/741
(58) Field of Search ............................... 714/38, 39, 41, 714/32, 33, 34, 47, 25, 26, 734, 741, 742

(56) References Cited

U.S. PATENT DOCUMENTS

| | | | | |
|---|---|---|---|---|
| 4,622,647 A | * | 11/1986 | Sagnard et al. | 364/580 |
| 4,740,969 A | * | 4/1988 | Fremont | 371/12 |
| 4,984,239 A | * | 1/1991 | Suzuki et al. | 371/3 |
| 4,995,037 A | * | 2/1991 | Imada et al. | 371/16.1 |
| 5,504,862 A | * | 4/1996 | Suzuki et al. | 395/183.09 |
| 5,604,895 A | * | 2/1997 | Raimi | 395/500 |
| 5,633,812 A | * | 5/1997 | Allen et al. | 364/578 |
| 6,021,261 A | * | 2/2000 | Barrett, Jr. et al. | 395/183.13 |
| 6,052,809 A | * | 4/2000 | Bowden | 714/738 |
| 6,295,623 B1 | * | 9/2001 | Lesmeister et al. | 714/741 |

FOREIGN PATENT DOCUMENTS

JP    5-224995    9/1993

* cited by examiner

*Primary Examiner*—Nadeem Iqbal
(74) *Attorney, Agent, or Firm*—Staas & Halsey LLP

(57) ABSTRACT

A method of detecting a cause of a failure in a computer includes the steps of performing real-device testing by having a computer execute all instructions of a test program, performing simulator testing by having the computer execute part of the instructions of the test program and having a simulator execute the remainder of the instructions of the test program, and comparing results of the real-device testing with results of the simulator testing so as to identify a portion of the test program that causes a failure.

10 Claims, 7 Drawing Sheets

METHOD OF DETECTING CAUSE OF FAILURE IN COMPUTER

BACKGROUND OF THE INVENTION

1. Field of the Invention

The present invention generally relates to a method of detecting a cause of failure in a computer, and particularly relates to a method of detecting a cause of failure in a computer by comparing results of computer testing with results of simulator testing.

2. Description of the Related Art

In testing of a computer device, there is a method of detecting a cause of failure in a computer by comparing results of computer testing obtained by executing a test program on the computer with results of simulator testing obtained by executing the test program on a simulator.

In this method, a test program is executed on the computer and the simulator, and the computer results and the simulator results are compared to estimate a failed program portion where a cause of failure may be in existence. In the failed program portion where a cause of failure may be present, points of record are marked so as to record logs or dumps at the marked points (i.e., instructions for recording logs and dumps are embedded into the test program). The test program is executed again on the computer and the simulator to generate test results, which are compared to further limit the failed portion where a cause of failure may be present. This procedure is repeated as many times as necessary until an exact point where a cause of failure is present is pinpointed.

In this method of detecting a cause of failure in a computer, planting of points of record (i.e., embedding of instructions for recording logs and dumps) in the failed portion may affects a structure of the test program at the very position where a cause of failure may be present. If detectability of a cause of failure depends on the program structure, the cause of failure may not appear when the test is repeated next time.

Further, execution of the entire test program on the computer and the simulator needs to be repeated each time points of record are newly marked in the failed portion. This involves undesirably excessive time and labor.

Further, analysis of the test results obtained from the computer and the simulator may require different interpretation for a different computer, and, thus, only an expert can provide a proper analysis.

Accordingly, there is a need for a method of detecting a cause of failure in a computer which can identify a failure location without planting points of record or without relying on expert analysis, and can reduce time and labor for testing.

SUMMARY OF THE INVENTION

Accordingly, it is a general object of the present invention to provide a method of detecting a cause of failure in a computer which can satisfy the need described above.

It is another and more specific object of the present invention to provide a method of detecting a cause of failure in a computer which can identify a failure location without planting points of record or without relying on expert analysis, and can reduce time and labor for testing.

In order to achieve the above object according to the present invention, a method of detecting a cause of a failure in a computer, comprising the steps of performing real-device testing by having a computer execute all instructions of a test program, performing simulator testing by having the computer execute part of the instructions of the test program and having a simulator execute the remainder of the instructions of the test program, and comparing results of the real-device testing with results of the simulator testing so as to identify a portion of the test program that causes a failure.

In the method described above, a portion of the test program that causes a failure can be identified by checking if the comparison indicates a match or mismatch. Namely, if the comparison indicates a match, the part of the instructions executed by the computer in the simulator testing should include a cause of a failure under an assumption that there is a failure (i.e., there should be a mismatch). On the other hand, if the comparison indicates a mismatch, the remainder of the instructions executed by the simulator in the simulator testing should include a cause of a failure.

This method thus can identify a failure location simply by comparing results of the real-device testing with results of the simulator testing, thereby eliminating a need for planting of record points or a need for skill of expert analysis. Further, the real-device testing needs to be performed only once despite the fact that the simulator testing may be repeated many times while changing the part of the instructions executed by the computer until the failure location is identified with a sufficient specificity. Thus, the method of the present invention can reduce time and labor required for the testing.

This scheme for identifying a failure location works perfectly well even if the role of the computer and the role of the simulator are exchanged.

Namely, according to another aspect of the present invention, a method of detecting a cause of a failure in a computer includes the steps of performing simulator testing by having a simulator execute all instructions of a test program, performing real-device testing by having the simulator execute part of the instructions of the test program and having a computer execute the remainder of the instructions of the test program, and comparing results of the simulator testing with results of the real-device testing so as to identify a portion of the test program that causes a failure.

Moreover, this scheme for identifying a failure location works perfectly well even if each of the two testings to be compared with each other is a mixture of real-device testing and simulator testing.

Namely, according to yet another aspect of the present invention, a method of detecting a cause of a failure in a computer includes the steps of a) performing first testing by having a computer execute all or part of instructions of a test program and having a simulator execute the remainder of the instructions of the test program, b) performing second testing by having the simulator execute said all or part of the instructions of the test program and having the computer execute said remainder of the instructions of the test program, c) making a first comparison between results of the first testing and results of the second testing, d) performing, if the first comparison indicates a mismatch, third testing in which the second testing is performed on all the instructions of the test program except for a selected part of the instructions where the selected part of the instructions is subjected to the first testing, e) making a second comparison between results of the first testing and results of the third testing, f) ascertaining that the selected part of the instructions includes a cause of a failure if the second comparison indicates a match, and g) ascertaining that a remaining portion other than the selected part of the instructions includes a cause of a failure if the second comparison indicates a mismatch.

Other objects and further features of the present invention will be apparent from the following detailed description when read in conjunction with the accompanying drawings.

DESCRIPTION OF THE PREFERRED EMBODIMENTS

In the following, embodiments of the present invention will be described with reference to the accompanying drawings.

Figure 1:
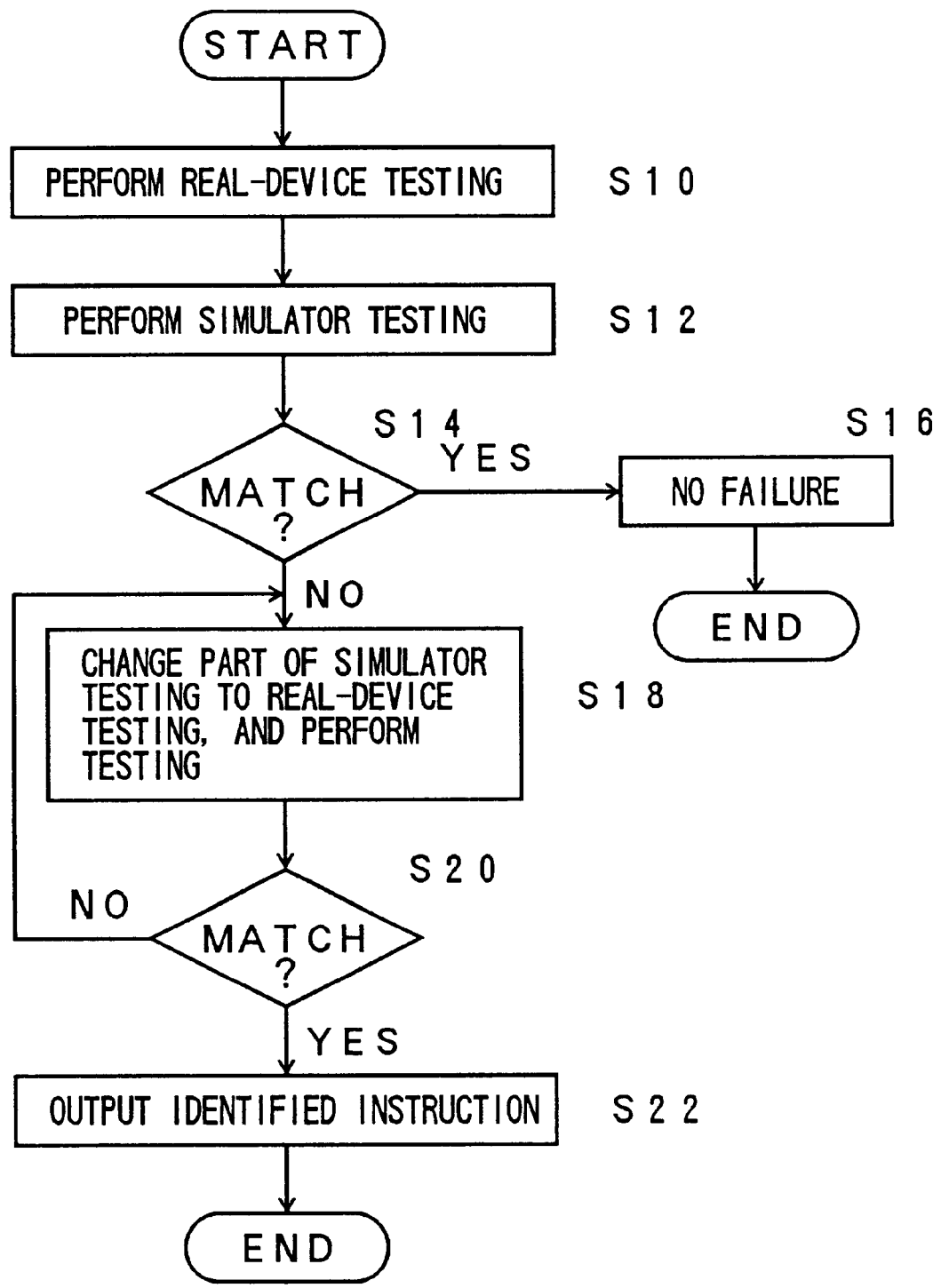
FIG. 1 is a flowchart of a method of detecting a cause of failure in a computer according to a first embodiment of the present invention.

FIG. 1 is a flowchart of a method of detecting a cause of failure in a computer according to a first embodiment of the present invention.

At a step S10, all the instructions of a test program are executed by a computer to be tested. Such execution of the test-program instructions by the computer to be tested is referred to as real-device testing.

At a step S12, all the instructions of the test program are also executed by a simulator. Such execution of the test program by the simulator is referred to as simulator testing.

At a step S14, a comparison is made between the results of real-device testing and the results of simulator testing, thereby checking if these results match. If the two sets of test results match, the procedure goes to a step S16, at which it is ascertained that there is no failure in the computer. This ends the procedure.

If there is a mismatch, it is an indication of a cause of failure in the computer. In this case, the procedure goes to a step S18.

At the step S18, the test program is executed again on the simulator as simulator testing, except that one or more of the instructions which were executed on the simulator in the previous testing are now executed on the computer as real-device testing.

Figure 2A:
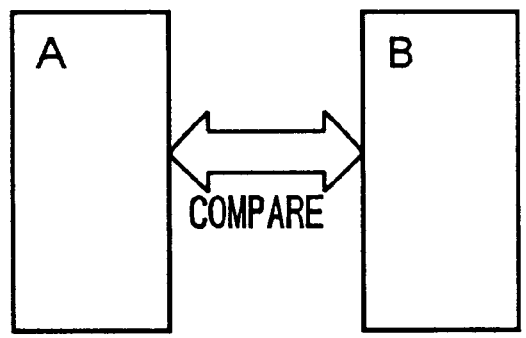
FIGS. 2A through 2C are illustrative drawings showing combinations of real-device testing and simulator testing.
Figure 2B:
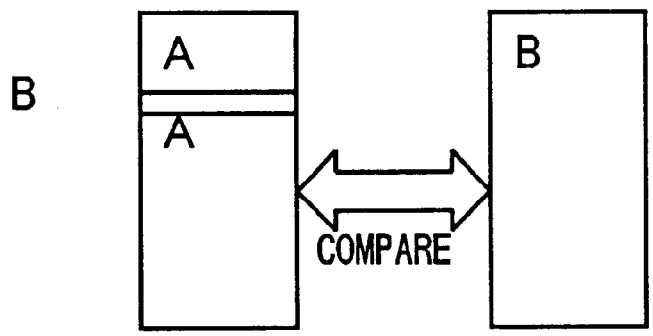
Figure 2C:
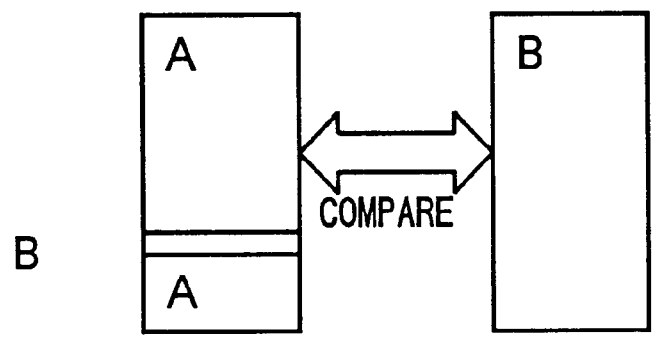

FIGS. 2A through 2C are illustrative drawings showing combinations of real-device testing and simulator testing.

In FIGS. 2A through 2C, results of real-device testing are shown by a symbol "B", and results of simulator testing are shown by a symbol "A". The first set of real-device testing and simulator testing are shown in FIG. 2A. When a second testing is conducted at the step S18, part of the simulator testing is changed to real-device testing as shown in FIG. 2B. When a third or following testing is conducted again at the step S18, part of the instructions assigned to real-device testing in the previous test is returned to simulator testing, and a different part of the instructions is newly assigned to real-time testing.

With reference to FIG. 1 again, at a step S20, test results obtained from a mixture of simulator testing and real-device testing performed at the step S18 are compared with the results of the real-device testing performed at the step S10. That is, a check is made as to if these two sets of test results match, thereby checking if an instruction that caused a mismatch in the simulator testing of the step S12 is identified. If the instruction causing a mismatch is identified, such instruction is displayed or printed out at a step S22. This ends the procedure.

If the cause is not identified, the procedure goes back to the step S18. At the step S18, a portion of the test program is assigned to real-device testing as shown in FIG. 2C by selecting the portion different from a portion that was assigned to real-device testing in the previous testing, and, then, the test program is executed. After this, the procedure goes to the step S20 to compare the test results. The steps S18 and S20 are repeated until an instruction causing a failure (i.e., mismatch) in the real-device testing of the step S10 is identified.

According to this embodiment, one or more instructions are selected from portion of the test program that was executed by a simulator in the previous testing, and are changed from simulator testing to real-device testing in new execution of the test program. This method does not require planting of points of record, which was conventionally required in order to record logs and dumps in a failed portion of the test program. This embodiment therefore avoids a change in the test-program structure, thereby insuring that repeatability of failures is not affected.

Further, the real-device testing at the step S10 needs to be performed only once, and the same test results from this real-device testing are repeatedly used as a reference in comparisons made at the step S20. No need for repeating real-device testings saves time and labor involved in the testing. Moreover, the method of this embodiment does not require analysis of test results for estimating a failed portion, thereby obsoleting skills for expert analysis.

Figure 3:
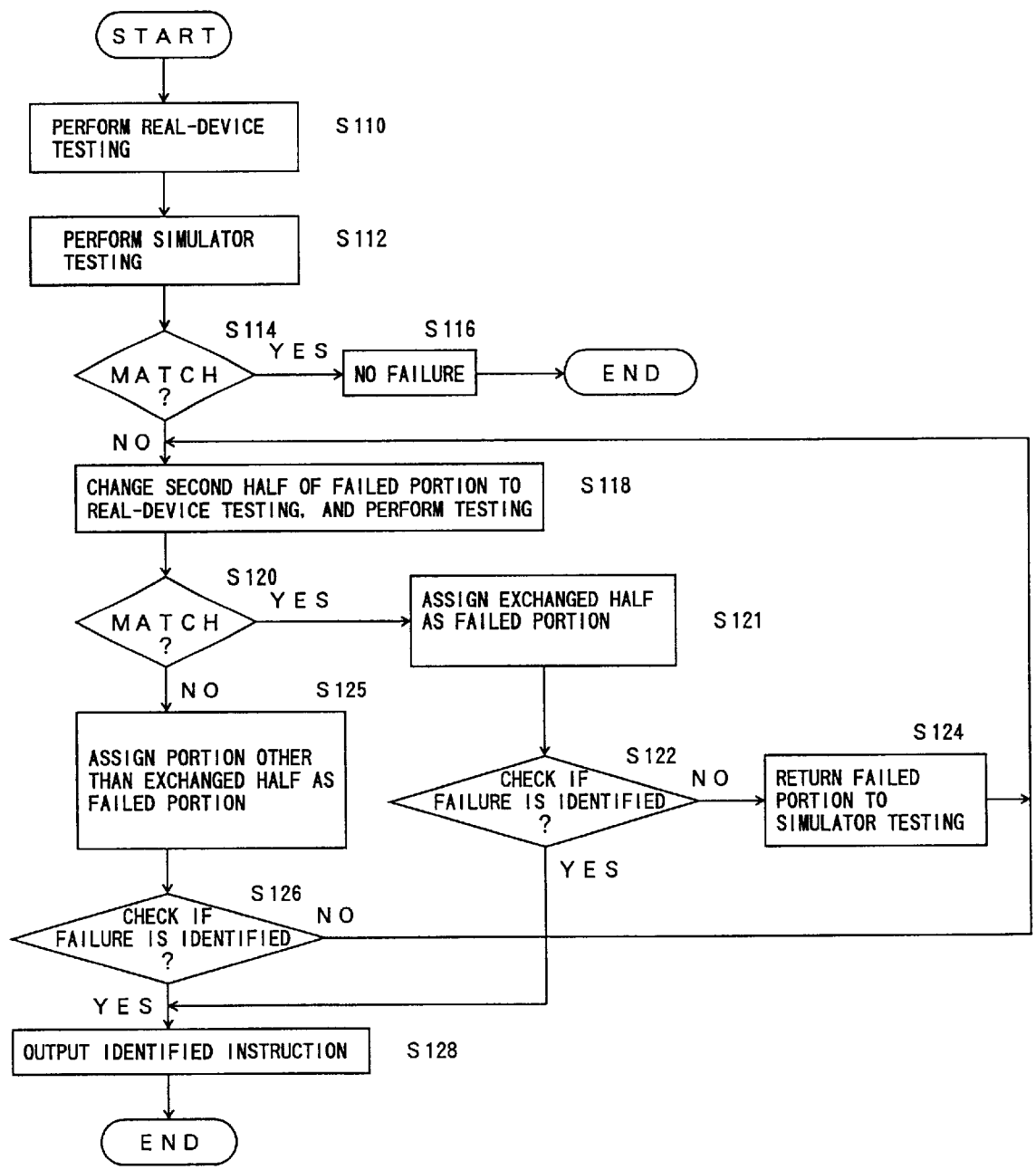
FIG. 3 is a flowchart of a method of detecting a cause of failure in a computer according to a second embodiment of the present invention.

FIG. 3 is a flowchart of a method of detecting a cause of failure in a computer according to a second embodiment of the present invention.

At a step S110, all the instructions of a test program are executed by a computer to be tested. Such execution of the test-program instructions by the computer to be tested is referred to as real-device testing as in the previous embodiment.

At a step S112, all the instructions of the test program are also executed by a simulator. Such execution of the test program by the simulator is referred to as simulator testing as in the previous embodiment.

At a step S114, a comparison is made between the results of real-device testing and the results of simulator testing, thereby checking if these results match. If the two sets of test results match, the procedure goes to a step S116, at which it is ascertained that there is no failure in the computer. This ends the procedure.

If there is a mismatch, it is an indication of a cause of failure in the computer. In this case, the procedure goes to a step S118.

At the step S118, the test program is executed again on the simulator as simulator testing, except that a first half (or second half) of the test-program portion that was found to be a failed portion in the previous simulator testing is now executed on the computer as real-device testing. The half that is executed as real-device testing is hereinafter called an exchanged half.

FIGS. 4A through 4D are illustrative drawings showing combinations of real-device testing and simulator testing.

Figure 4A:
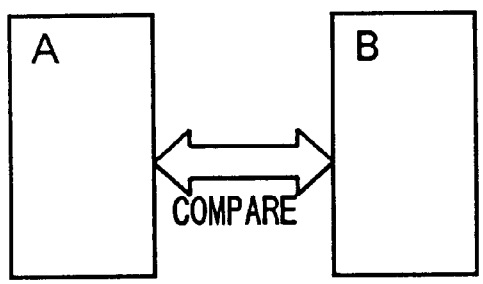
FIGS. 4A through 4D are illustrative drawings showing combinations of real-device testing and simulator testing.
Figure 4B:
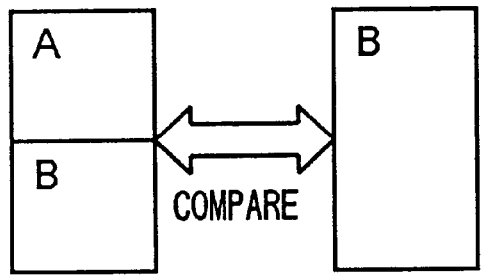

In FIGS. 4A through 4D, results of real-device testing are shown by a symbol "B", and results of simulator testing are shown by a symbol "A". The first set of real-device testing and simulator testing are shown in FIG. 4A. When a second testing is conducted at the step S118, a second half of the test program in the simulator testing is changed to real-device testing as shown in FIG. 2B. When a third or following testing is conducted again at the step S118, a second half of a test-program portion that was identified as a failed portion in the previous simulator testing is assigned to real-device testing.

With reference to FIG. 3 again, at a step S120, test results obtained from a mixture of simulator testing and real-device testing performed at the step S118 are compared with the results of the real-device testing performed at the step S110. That is, a check is made as to if these two sets of test results match. If a match is found, the procedure goes to a step S121.

At the step S121, it is ascertained that the exchanged half of the step S118 is a failed portion where a cause of failure is present, so that the exchanged half is marked as a new failed portion.

At a step S122, a check is made as to whether an instruction causing a failure is identified. If the instruction causing a failure is identified, such instruction is displayed or printed out at a step S128. This ends the procedure.

If the cause is not identified, the procedure goes to a step S124.

Figure 4C:
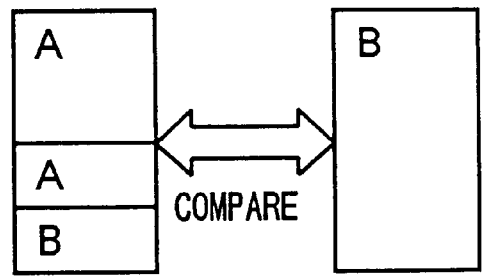

At the step S124, the failed portion of the test program is returned to the part of simulator testing. Then, the procedure goes back to the step S118. At the step S118, a second half of the failed portion is changed to real-device testing as shown in FIG. 4C, and the test program is executed again.

If the check at the step S120 finds that the two sets of test results do not match, the procedure goes to a step S125.

At the step S125, it is ascertained that the exchanged half of the step S118 is free from a cause of failure, so that the other half of the failed portion is marked as a new failed portion.

At a step S126, a check is made as to whether an instruction causing a failure is identified. If the instruction causing a failure is identified, such instruction is displayed or printed out at the step S128. This ends the procedure.

Figure 4D:
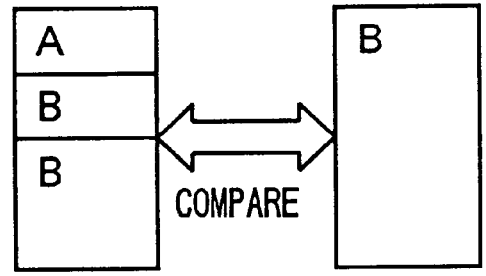

If the cause is not identified, the procedure goes back to the step S118. At the step S118, a second half of the failed portion is changed to real-device testing as shown in FIG. 4D, and the test program is executed again. Thereafter, the procedure goes to the step S120 to compare the test results.

The steps S118 through S126 are repeated as many times as necessary until an instruction causing a failure in the real-device test at the step S110 is identified. The identified instruction is displayed or printed out at the step S128 before the procedure comes to an end.

According to this embodiment, part of the instructions in the failed portion is changed from simulator testing to real-device testing in new execution of the test program. This method does not require planting of points of record, which was conventionally required in order to record logs and dumps in a failed portion of the test program. This embodiment therefore avoids a change in the test-program structure, thereby insuring that repeatability of failures is not affected.

Further, the real-device testing at the step S110 needs to be performed only once, and the same test results from this real-device testing are repeatedly used as a reference in comparisons made at the steps S114 and S120. No need for repeating real-device testings saves time and labor involved in the testing. Moreover, the method of this embodiment gradually narrows a failed portion simply by checking whether results of a mixture of simulator testing and real-device testing match results of real-device testing. This method thus does not require expert analysis of test results for estimating a failed portion, thereby obsoleting skills for expert analysis.

It should be noted that a half of the failed portion changed to real-device testing at the step S118 may be a first half rather than a second half as employed in this embodiment. Further, an exchanged portion does not have to be an exact half of the failed portion, and can be an about half or a portion defined as a predetermined percentage or a varying percentage of the failed portion.

Further, a portion that is changed to real-device testing may be selected from a set of instructions that are more likely to cause failures or more likely to be a cause of failures than other instructions. Such instructions may be registered in a database or the like in advance, and a process at the step S118 refers to the database to determine which instructions are to be changed to real-time testing.

Moreover, instructions may be provided with numbers that define an order in which a given instruction is changed to real-device testing ahead of other instructions. A process at the step S118 refers to the order number to determine which instructions are to be changed to real-time testing.

Variations described above can make it easier to implement an automatic defect detection.

In the above embodiments, a portion of simulator testing is change to real-time testing when there is a mismatch between the simulator testing and the real-device testing. Alternatively, a portion of real-device testing may be changed to simulator testing when there is a mismatch between the simulator testing and the real-device testing. In such a case, portions indicated by the symbol "A" in FIGS. 4A through 4D correspond to real-device testing, and portions indicated by the symbol "B" correspond to simulator testing.

Further, simulator testing and real-device testing do not have to be separated as in the embodiment described above.

Figure 5:
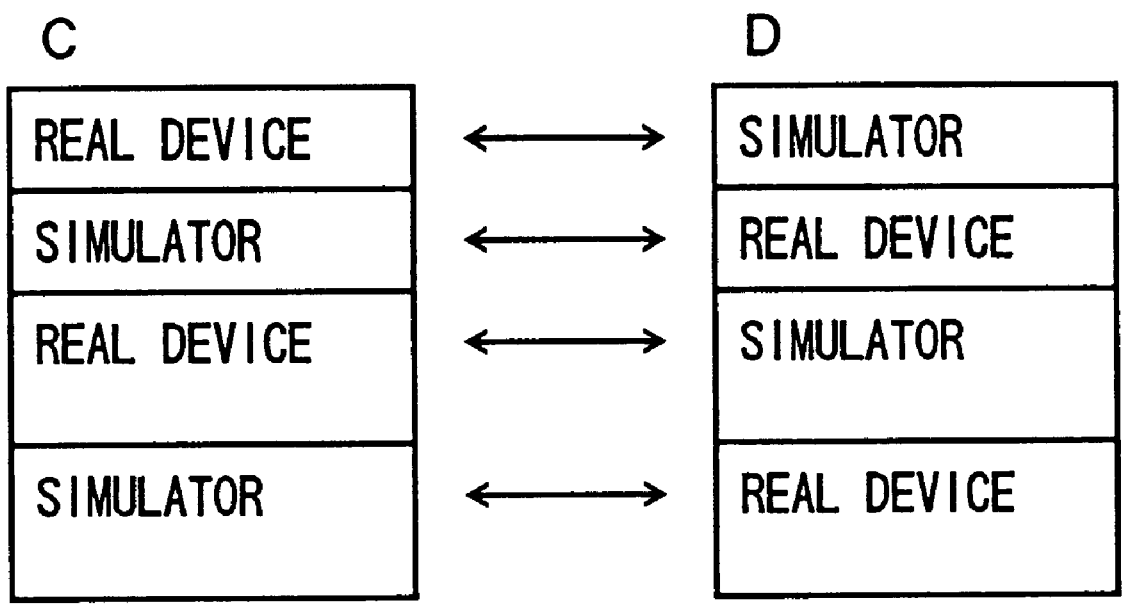
FIG. 5 is an illustrative drawing showing a complete mixture of simulator testing and real-device testing.

FIG. 5 is an illustrative drawing showing a complete mixture of simulator testing and real-device testing.

In FIG. 5, a first set of mixed simulator testing and real-device testing is referred as a test C, and a second set of mixed simulator testing and real-device testing is referred to as a test D where each simulator-testing segment is exchanged with a real-device-testing segment and vice versa between the test C and the test D. Then, the flowchart of FIG. 3 may be performed with the test C replacing every simulator testing and the test D replacing every real-device testing, resulting in an identification of a failure causing instruction in the same manner as in the second embodiment.

Moreover, when given instructions have a low likelihood of generating a failure in the test program, such instructions may be excluded from the defect-detect testing, and may be always performed by a real device both at the step S110 and at the step S112. This makes the defect detection process more efficient.

When a computer is tested, a test program used in the test may be comprised of instructions 1 through N to be executed by an arithmetic logic unit of the computer in real-device testing. Part (e.g., an instruction 4) of the test program is changed to simulator testing by executing a test program in which the instruction 4 is replaced by a supervisor call (SVC).

Figure 6:
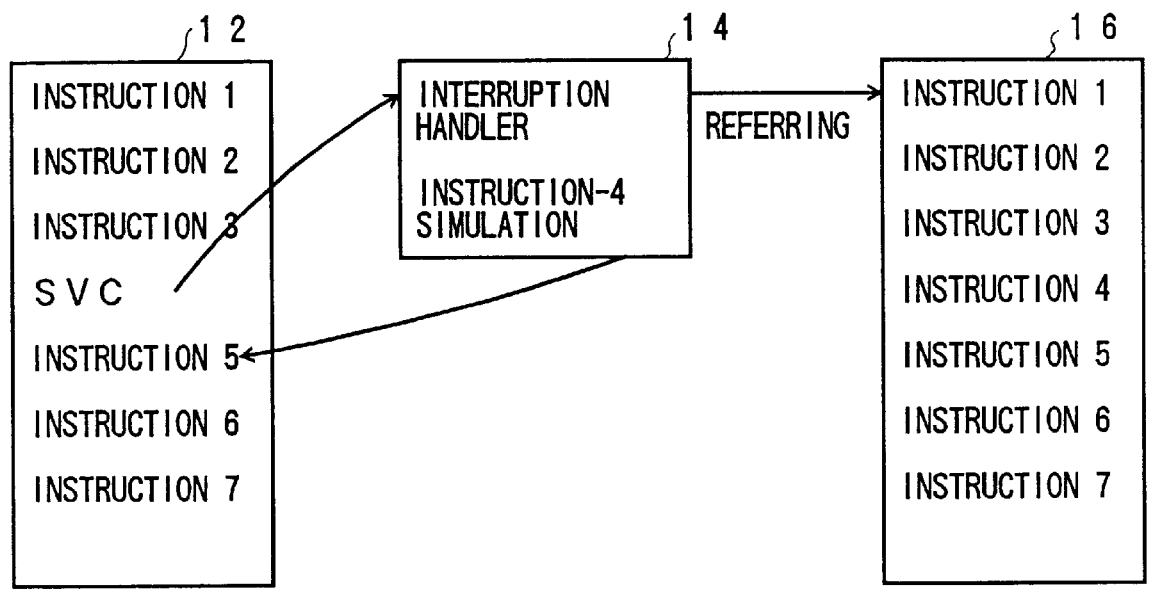
FIG. 6 is an illustrative drawing showing replacement of an instruction with a supervisor call.

FIG. 6 is an illustrative drawing showing replacement of an instruction with a supervisor call.

As shown in FIG. 6, a test program 12 has the instruction 4 replaced by the supervisor call. When the test program 12 is executed, an interruption handler 14 called by the supervisor call activates a simulator 16 to simulate the instruction 4. After a completion of a simulation, the interruption handler 14 returns control to the test program 12. Thereafter, the remaining instructions 5 through N are executed, thereby completing execution of the test program having simulator testing and real-device testing mixed therein. It should be noted that all the instructions 1 through N may be replaced by supervisor calls when the entire test program is performed as simulator testing.

When a failure occurs depending on whether or not there is a particular combination of instructions, such a failure may disappear if a border between simulator testing and real-device testing divides the particular combination of instructions. In such a case, an instruction causing the failure may be mistakenly identified and reported.

In consideration of this, a person who is in charge of the testing should check the instruction that is reported as a cause of a failure, and check if this instruction is likely to be a real cause of the failure. If it is not likely to be a real cause, a measure should be taken to correctly identify a cause of the failure.

Figure 7:
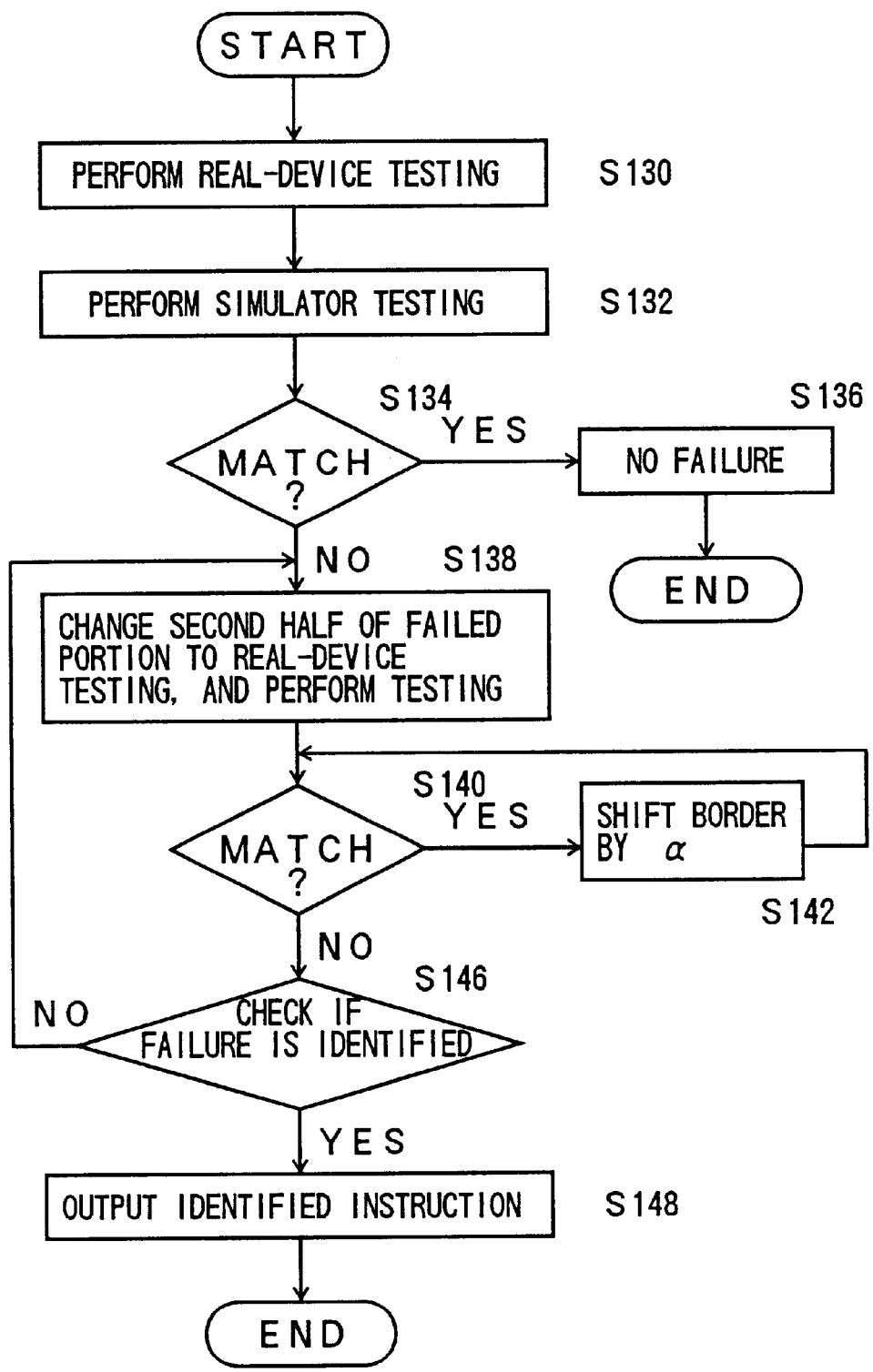
FIG. 7 is a flowchart of a method of detecting a cause of failure in a computer according to a third embodiment of the present invention.

FIG. 7 is a flowchart of a method of detecting a cause of failure in a computer according to a third embodiment of the present invention. This method is performed when an instruction reported as a cause of a failure does not seem to be a real cause.

At a step S130, all instructions of the test program are performed by the computer (i.e., as real-device testing).

At a step S132, all the instructions (steps) of the test program are performed by the simulator.

Since the steps S130 and S132 are the same as the steps S110 and S112 of the second embodiment, the steps S130 and S132 do not have to be carried out if test results obtained at the steps S110 and S112 still remain in memory.

At a step S134, a comparison is made between the results of real-device testing and the results of simulator testing, thereby checking if these results match. If the two sets of test results match, the procedure goes to a step S136, at which it is ascertained that there is no failure in the computer. This ends the procedure.

If there is a mismatch, it is an indication of a cause of failure in the computer. In this case, the procedure goes to a step S138.

At the step S138, a second half of a failed portion that is found to be a failed portion in the previous testing is assigned to real-device testing, and the test program is executed.

At a step S140, test results of the mixture of simulator testing and real-device testing performed at the step S138 are compared with the test results of real-device testing obtained at the step S130. That is, a check is made as to whether the two sets of test results match.

If the test results match (i.e., no failure is observed), it is ascertained that an instruction or a set of instructions causing a failure resides at or around the border between the simulator testing and the real-device testing. At a step S142, therefore, the border between the simulator testing and the real-device testing is shifted toward the end of the test program by $\alpha$ steps (i.e., $\alpha$ instructions), and, then, the test program is executed again. Namely, the first half plus $\alpha$ steps is assigned to simulator testing, and the second half minus the $\alpha$ steps is assigned to real-test testing. Here, $\alpha$ is a predetermined number of instructions, and can be any number, which may be three or four, for example. Thereafter, the procedure goes back to the step S140, at which a comparison is made between the newly obtained test results and the test results of real-device testing obtained at the step S130, so as to check if the two sets of test results match.

If the step S140 finds a mismatch, the procedure goes to a step S146.

At the step S146, a check is made as to whether an instruction causing a failure is identified.

If it is identified, the identified instruction is displayed or printed out at a step S148. This ends the procedure.

If an instruction causing a failure is not identified, the procedure goes back to the step S138, at which a second half of a failed portion that is found to be a failed portion in the previous testing is assigned to real-device testing, and the test program is executed. Thereafter, the procedure goes to the step S140 so as to compare the test results.

The steps S138 through S146 described above are repeated as many times as necessary until an instruction causing a failure in the real-device testing of the step S130 is identified. The identified instruction is displayed or printed out at the step S148 before the procedure goes to an end.

According to this embodiment, when the test results of a mixture of simulator testing and real-device testing do not match the test results of real-device testing, a second half of the simulator-testing portion is changed to real-device testing. When the test results match as a result, the border between the real-device testing and the simulator testing is shifted towards the end of the test program. Such a shift is made one after another until the test results exhibit a mismatch. This insures that the border between simulator testing and real-device testing does not reside at such a position as to divide a set of instructions causing a failure. That is, this embodiment prevents unplanned disappearance of a failure, thereby avoiding mistaken identification of a cause of a failure.

Further, the present invention is not limited to these embodiments, but various variations and modifications may be made without departing from the scope of the present invention.

The present application is based on Japanese priority application No. 11-126101 filed on May 06, 1999, with the Japanese Patent Office, the entire contents of which are hereby incorporated by reference.

What is claimed is:

1. A method of detecting a cause of a failure in a computer, comprising:

performing real-device testing by having a computer execute all instructions of a test program;

performing simulator testing by having the computer execute part of the instructions of the test program and having a simulator execute the remainder of the instructions of the test program; and comparing results of the real-device testing with results of the simulator testing to identify a portion of the test program that causes a failure.

2. A method of detecting a cause of a failure in a computer, comprising:

performing simulator testing by having a simulator execute all instructions of a test program;

performing real-device testing by having the simulator execute part of the instructions of the test program and having a computer execute the remainder of the instructions of the test program; and comparing results of the simulator testing with results of the real-device testing to identify a portion of the test program that causes a failure.

3. A method of detecting a cause of a failure in a computer, comprising:

performing first testing by having a computer execute all or part of instructions of a test program and having a simulator execute the remainder of the instructions of the test program;

performing second testing by having the simulator execute said all or part of the instructions of the test program and having the computer execute said remainder of the instructions of the test program;

making a first comparison between results of the first testing and results of the second testing;

performing, if the first comparison indicates a mismatch, third testing in which the second testing is performed on all the instructions of the test program except for a selected part of the instructions where the selected part of the instructions is subjected to the first testing;

making a second comparison between results of the first testing and results of the third testing;

ascertaining that the selected part of the instructions includes a cause of a failure if the second comparison indicates a match; and ascertaining that a remaining portion other than the selected part of the instructions includes a cause of a failure if the second comparison indicates a mismatch.

4. The method as claimed in claim 3, further comprising repeating said performing third testing, said making a second comparison, said ascertaining that the selected part includes a cause of a failure, and said ascertaining that a remaining portion includes a cause of a failure, by selecting a different part of the instructions as the selected part of the instructions until a cause of a failure is identified.

5. The method as claimed in claim 4, wherein a portion of the selected part of the instructions is selected as the selected part of the instructions for next testing if the second comparison indicates a match.

6. The method as claimed in claim 4, further comprising disregarding some instructions of the test program by setting aside said some instructions to be executed by the computer in any testing if said some instructions are known to be unlikely to cause a failure.

7. The method as claimed in claim 4, wherein a ratio of the selected portion of the instructions for next testing to a portion of the instructions that is ascertained to include a cause of a failure in current testing is a predetermined ratio.

8. The method as claimed in claim 4, wherein the selected part of the instructions is selected successively in a descending order of a likelihood of the selected part being a cause of a failure.

9. The method as claimed in claim 4, wherein the selected part of the instructions is selected successively in a predetermined order.

10. The method as claimed in claim 4, wherein a border between the selected part of the instructions and an adjacent part of the instructions is moved toward the selected part of the instructions by a predetermined number of instructions to reduce the selected part of the instructions for next testing if the second comparison indicates a match.

* * * * *